US011754579B2

(12) United States Patent
Hui et al.

(10) Patent No.: US 11,754,579 B2
(45) Date of Patent: Sep. 12, 2023

(54) SYSTEMS AND METHODS FOR RAPID GENERATION OF DROPLET LIBRARIES

(71) Applicant: THE REGENTS OF THE UNIVERSITY OF CALIFORNIA, Oakland, CA (US)

(72) Inventors: Elliot En-Yu Hui, Irvine, CA (US); Erik Morgan Werner, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 767 days.

(21) Appl. No.: 16/620,127

(22) PCT Filed: Jun. 6, 2018

(86) PCT No.: PCT/US2018/036327
§ 371 (c)(1),
(2) Date: Dec. 6, 2019

(87) PCT Pub. No.: WO2018/226876
PCT Pub. Date: Dec. 13, 2018

(65) Prior Publication Data
US 2020/0150142 A1 May 14, 2020

Related U.S. Application Data

(60) Provisional application No. 62/515,745, filed on Jun. 6, 2017.

(51) Int. Cl.
*G01N 35/10* (2006.01)
*B01J 19/00* (2006.01)

(52) U.S. Cl.
CPC ...... *G01N 35/1002* (2013.01); *B01J 19/0093* (2013.01); *G01N 2035/1046* (2013.01)

(58) Field of Classification Search
CPC ..... B01L 2200/0642; B01L 2400/0622; B01L 3/0265; B01L 2400/0487; B01L 3/502738;
(Continued)

(56) References Cited

U.S. PATENT DOCUMENTS 6,384,905 B1 * 5/2002 Barrows ................ G06T 7/269
356/28
6,408,878 B2 6/2002 Unger et al.
(Continued)

FOREIGN PATENT DOCUMENTS

EP 3248681 A1 11/2017
WO WO2005060393 A3 7/2005
(Continued)

OTHER PUBLICATIONS

Todd Thorsen et al., Microfluidic Large-Scale Integration, Science, 2002, 580-584, vol. 298.
(Continued)

*Primary Examiner* — Shogo Sasaki
(74) *Attorney, Agent, or Firm* — NGUYEN TARBET LLC (57) ABSTRACT

Arrays of droplet-on-demand dispensers are controlled by a row-column addressing scheme that can reduce the number of on-chip address lines, thereby making it feasible to construct large dispenser arrays. Decoders are used to further reduce the number of control lines that select a specific address line. A microfluidic logic controller includes row-select lines, each coupled to dispensers disposed on the same row, and column-select lines, each coupled to dispensers disposed on the same column such that each dispenser is associated with a unique row-column address. A logic circuit can actuate a dispenser only if the logic circuit receives signals from both of the row-select line and the column-
(Continued)

select line corresponding to the row-column address of the selected dispenser. Reagents can be dispensed from the dispenser array, thereby allowing for rapid formatting of a reagent library into microfluidic droplets.

3 Claims, 9 Drawing Sheets

(58) Field of Classification Search
CPC ............ B01L 2200/14; B01L 3/502784; B01J 2219/00389; B01J 2219/00695; B01J 19/0093; B01J 2219/00412; G01N 35/1002; G01N 2035/1034; G01N 2035/1046; C40B 60/00
See application file for complete search history.

(56) References Cited

U.S. PATENT DOCUMENTS

| | | | |
|---|---|---|---|
| 6,415,384 B1* | 7/2002 | Dave | G06F 30/30 |
| | | | 713/1 |
| 6,485,690 B1 | 11/2002 | Pfost et al. | |
| 7,217,878 B2* | 5/2007 | Ludwig | G10H 3/18 |
| | | | 84/622 |
| 8,286,665 B2 | 10/2012 | Mathies et al. | |
| 8,396,701 B2* | 3/2013 | Ludwig | G06F 30/20 |
| | | | 703/1 |
| 2003/0183301 A1 | 10/2003 | Massaro | |
| 2004/0223874 A1* | 11/2004 | Numajiri | B01L 3/502761 |
| | | | 422/400 |
| 2004/0224339 A1* | 11/2004 | Numajiri | B01L 3/502715 |
| | | | 435/6.1 |
| 2005/0180880 A1* | 8/2005 | Itoh | B01L 3/5027 |
| | | | 435/288.5 |
| 2007/0095413 A1 | 5/2007 | Zhu et al. | |
| 2007/0166199 A1 | 7/2007 | Zhou et al. | |
| 2008/0069739 A1* | 3/2008 | Ludwig | B01J 19/0093 |
| | | | 422/50 |
| 2008/0277005 A1 | 11/2008 | Unger et al. | |
| 2010/0224255 A1 | 9/2010 | Mathies et al. | |
| 2010/0252123 A1 | 10/2010 | Mathies et al. | |
| 2012/0022693 A1* | 1/2012 | Ludwig | G05D 7/0694 |
| | | | 700/282 |
| 2013/0165346 A1 | 6/2013 | Wang et al. | |
| 2014/0079571 A1 | 3/2014 | Hui et al. | |
| 2014/0332083 A1 | 11/2014 | Merten et al. | |
| 2016/0208833 A1 | 7/2016 | Hui et al. | |

FOREIGN PATENT DOCUMENTS

| | | |
|---|---|---|
| WO | WO2012097233 A1 | 7/2012 |
| WO | WO2013126483 A8 | 8/2013 |

OTHER PUBLICATIONS

Shaojiang Zeng et al., Microvalve-actuated precise control of individual droplets in microfluidic devices, Lab on a Chip, Mar. 12, 2009, 1340-1343, vol. 9.
Helena Zec et al., Microfluidic platform for on-demand generation of spatially indexed combinatorial droplets, Lab on a Chip, (2012), 3055-3062, vol. 12.

* cited by examiner

SYSTEMS AND METHODS FOR RAPID GENERATION OF DROPLET LIBRARIES

CROSS REFERENCE

This application is a 371 and claims benefit of PCT/US18/36327 filed Jun. 6, 2018, which claims benefit of U.S. Provisional Application No. 62/515,745, filed Jun. 6, 2017, the specification(s) of which is/are incorporated herein in their entirety by reference.

FIELD OF THE INVENTION

The present invention relates to the production of reagent libraries of chemical compounds or other substances for use in high-throughput screening, more specifically, to systems and methods for rapidly formatting a library into microfluidic droplets.

BACKGROUND OF THE INVENTION

An early stage of drug discovery involves screening large libraries of compounds in order to uncover leads that exhibit a desired chemical function. For example, a chemical reaction of interest can be performed in the presence of each candidate compound individually in order to identify the top compounds for inhibiting the reaction. Millions of compounds can be screened by using liquid handling robots to automatically dispense reagents into microtiter plates. A state-of-the-art lab can screen millions of compounds over a timeframe of weeks. In order to increase throughput and drive down cost, industries have sought to scale microliter plates to ever increasing density, allowing more reactions per plate (higher throughput) and lower reagent volume per reaction (lower cost). However, this progression has plateaued with 1536-well plates, as evaporation and interactions with the container walls become more significant for small reaction volumes and high surface-to-volume ratios.

Droplet microfluidics has been recognized as a potential means for employing smaller reaction volumes than possible on microtiter plates. Aqueous droplets are suspended in continuous phase fluids, such as oil, and manipulated in microfluidic channels, thereby allowing chemical reactions to be performed in micro- to femtoliter volumes. Evaporation and container wall interactions are minimized since the droplets are completely surrounded in oil. However, while droplet microfluidics has proven to be an effective platform for a number of biochemical applications, this technology has yet to gain traction in high-throughput screening. A critical hurdle in the use of droplet microfluidics in high-throughput screening is the challenge of efficiently converting a compound library from a microliter plate format to a microfluidic droplet format. This process typically employs similar liquid handling approaches as used in standard high-throughput screening, and thus this step can negate any speed advantage afforded by the microfluidic system. The challenge of interfacing between the macroscale and microscale regimes is a significant barrier to realizing the savings in cost and time potentially afforded by droplet microfluidics.

The present invention features a device for rapidly formatting a chemical compound library into microfluidic droplets, addressing the challenge of interfacing between the macroscale and the microscale regimes. The device may comprise an array of reservoirs that can be filled with a reagent library, including but not limited to a drug compound library. Once filled, each reservoir can dispense microfluidic droplets on demand. After the initial filling process, the massively parallel array can rapidly dispense a complete library of compounds in droplet format, and each reservoir stores enough reagent to allow many droplet libraries to be generated before the reservoirs need to be refilled. Each droplet library can then be employed for high-throughput screening in drug development. This present invention can allow for high-throughput screening of drug compound libraries to be performed significantly faster and cheaper than is possible with current approaches.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

It is an objective of the present invention to provide a row-column addressable droplet-on-demand array for droplet generation to produce reagent libraries. Embodiments of the invention are given in the dependent claims. Embodiments of the present invention can be freely combined with each other if they are not mutually exclusive.

In some aspects, the present invention features a system for generating a reagent droplet library. The system may comprise a dispenser array having a plurality of droplet dispensers each fluidly coupled to a well or reservoir storing a reagent therein. The droplet dispenser includes a dispensing valve configured to dispense the reagent as a microfluidic droplet or plug from the well into a microfluidic channel. In some embodiments, the array of droplet dispensers comprises up to and beyond one million droplet dispensers. The system further includes a scheme to control the large array of droplet dispensers by leveraging microfluidic logic comprising Boolean logic gates implemented by using pneumatic or hydraulic valves, in which digital information is encoded by high and low pressure.

In some aspects, the system includes a device containing the high-density array of wells. For example, this device includes a 1000×1000 array containing one million wells. In some embodiments, the dimensions of the array are such that the array is compatible with commercial liquid handling systems. For instance, in a commercial system capable of dispensing into 100 μm wells that are spaced 100 μm apart, a 1000×1000 array can occupy a reasonable size of 20 cm×20 cm. Once the wells are filled, they may be sealed to prevent evaporation. Options include covering each well with an adhesive layer or dispensing oil into each well to cover the compound solution. The process of loading a reagent library into the well array can be relatively slow, in some instances, taking days or longer to complete; but once this process is completed, the entire library can be generated in droplet format very quickly, on the timescale of hours. In preferred embodiments, each well can store sufficient amounts of a compound or substance to dispense tens of droplets, if not more, thus generating many droplet libraries before the array needs to be refilled. Each well can also integrate a dispense mechanism that, when triggered, can dispense single droplets from the well into a microfluidic network. Thus, the present invention can bridge between the macroscale and microscale regimes by having inputs to the system interfacing to existing macroscale liquid handling tools, and an output that is a microscale library of microfluidic droplets.

In some embodiments, the dispensing strategy of the present invention can be scaled up to a million-well array or beyond. A microfluidic channel network, which can be a common oil microfluidic channel or a plurality of microfluidic channels, winds beneath all of the wells of the array, and a pneumatic dispensing valve gates the connection between each well and the channel. If the oil channel is held at a lower pressure than the well, liquid from the well can be dispensed into the channel when the valve is opened. Droplets or plugs of different volumes can be dispensed by controlling how long the valve is held open. In one embodiment, the pneumatic valves are normally closed membrane valves that are closed at rest and open when a vacuum is applied. This has the advantage that all dispensing valves remain closed when the device is disconnected, which is useful when loading a device or when storing a loaded device.

Figure 2A:
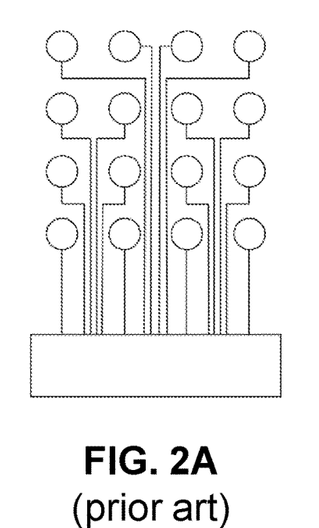
FIG. 2A is an example of a prior art control circuit for direct addressing of a valve array, which illustrates the density limits imposed by the number of control lines. As array size increases, there is a corresponding increase in the number of address lines that must be routed between each node of the array.
Figure 2B:
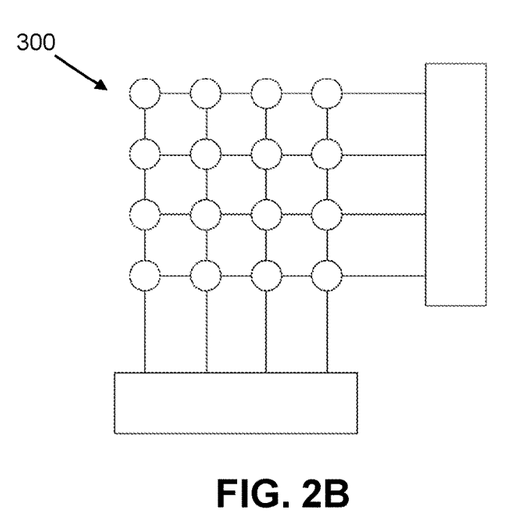
FIG. 2B shows the row-column addressing scheme of the present invention, which illustrates how valves can be densely packed and scaled. With row-column addressing, the array can scale up without increasing the density of the address lines.

One of the challenges in using large arrays is the control and addressing of individual pneumatic valves for each well in the array. While small (N=4) droplet-on-demand arrays have been demonstrated, existing control schemes do not scale to large arrays. U.S. Pat. No. 8,286,665B2 of Mathies et al. discloses a logic circuit that addresses N independent valves with $2 \log_2$ (N) input control lines. However, a significant limitation is that each valve requires an independent address line. As shown in FIG. 2A, large arrays of valves require equally large numbers of address lines, and the array size is therefore limited by the number of address lines that can fit onto a chip.

Contrary to the Mathies' approach, the present invention employs row-column addressing using AND logic to switch the opening of each valve. Valves are organized into a rectangular array, with each valve possessing a unique row and column address. An individual valve can open when its row and column address lines are simultaneously activated, allowing N independent valves to be controlled by only $2*\sqrt{N}$ address lines. For example, 1 million valves require only 2000 address lines instead of 1 million address lines. By further integrating binary decoders, the address lines can be controlled by $2*\log_2 (\sqrt{N})$ control lines. For instance, the 2000 address lines can be controlled by only 20 input control lines. Thus, 1 million valves can be controlled by 20 input lines and only 2000 address lines required on chip. However, in order to control 1 million valves with the Mathies system, 40 input control lines and 1 million address lines would be required on chip, which is not possible to fabricate using currently available microfluidic technologies. Hence, the row-column addressing of the present invention is critical for making a large dispenser array feasible to construct.

A form of row-column addressing was described in Thorsen et al. (Thorsen, T., Maerkl, S. J. & Quake, S. R. Microfluidic large-scale integration. Science 298, 580-584 (2002)). However, this system did not employ logic gates, and so an entire row and an entire column of valves were opened whenever a row and column were addressed. Liquid could be loaded into specific row-column addresses by employing appropriate flow and flushing protocols, but the system could not independently control individual valves. The present invention employs pneumatic logic gates on chip to achieve Boolean AND functionality and thus independent control of individual valves, which is critical for achieving independent dispensing of different reagents.

Without wishing to limit the present invention, performing high throughput screening with a droplet library generated by the systems described herein can be much faster and much less expensive than current practice. The present invention employs a large array of valves controlled by microfluidic logic to accelerate the process of dispensing a large library of unique reagents. The present invention can also reduce reagent consumption and cost by formatting the libraries into microfluidic droplets.

While the present invention may be used in drug screening, it is not limited to pharmaceutical applications. In some embodiments, the present invention may be used to generate libraries for use in other non-pharmaceutical applications. In some other embodiments, the present invention may be used for droplet manipulation, including but not limited to, dispensing, merging, trapping, and splitting of droplets.

BRIEF DESCRIPTION OF THE DRAWINGS

The features and advantages of the present invention will become apparent from a consideration of the following detailed description presented in connection with the accompanying drawings in which:

FIGS. 8A-8E depict the generation of a combinatorial reagent droplet, green is represented by "G", yellow by "Y", red by "R", and blue by "B". Referring to FIGS. 8A-8C, green dye is injected into a droplet containing yellow dye as it passes the green reservoir. Red dye is subsequently injected as the droplet passes the red reservoir as shown in FIGS. 8D-8E.

FIGS. 10A-10B show non-limiting embodiments of Boolean AND logic for row-column addressing of droplet dispensers. In FIG. 10A, vacuum power is supplied on the column select line and gated by a valve controlled by the row select line. If both the row and column are activated, the dispense valve is opened and reagent is drawn into the oil channel due to the lower pressure applied to the channel. In FIG. 10B, the circuit is similar to the FIG. 10A, but the additional pulldown resistor provides a path to ground (atmospheric pressure), which allows the dispense valve to close when the row and column select lines are deactivated. Without the pulldown resistor, the timing of row and column deactivation must be more carefully controlled in order to allow the dispense valve to close properly.

FIGS. 11A-11B show alternative embodiments of Boolean AND logic for row-column addressing of droplet dispensers. FIGS. 11A-11B both depict logic circuits implementing Boolean AND functionality. FIG. 11A depicts an AND logic gate, while FIG. 11B depicts a NAND gate followed by a NOT gate.

DESCRIPTION OF PREFERRED EMBODIMENTS

Following is a list of elements corresponding to a particular element referred to herein:
100 system
102 row
104 column
110 droplet dispenser
115 dispensing valve
120 well
150 microfluidic channel network
200 dispensing array
300 microfluidic logic controller
310 first binary decoder
312 row control lines
314 row-select lines
320 second binary decoder
322 column control lines
324 column-select lines
350 logic circuit The microfluidic arrays and devices used herein may employ fluid volumes in the scale of microliters ($10^{-6}$) to femtoliters ($10^{-15}$) that are contained within sub-millimeter scale channels. The structural or functional features of the devices may be dimensioned on the order of mm-scale or less, such as on the scale of 10s of microns to 100s of microns. For example, a diameter or width of a channel or a dimension of an intersection or junction may range from <0.1 µm to greater than 1000 µm. Alternatively or in addition, a length of a channel may range from 10 µm to greater than cm-scale. In some embodiments, a width or diameter of a well may range from about 50 µm to greater than 1000 µm. In some other embodiments, a depth of a well may range from about 50 µm to greater than 1000 µm. Alternatively or in addition, the width, diameter, or depth of the well is sized so as to store a volume of reagent ranging from about 1 nl to greater than 100 nl.

As used herein, the term "reagent" is a substance or chemical compound for use in chemical or biochemical analysis or other reactions. For example, the reagent includes any substance or compound that may be used in a chemical reaction or added to test if a reaction occurs. In some embodiments, a reagent library includes a library of substances or chemical compounds. For instance, the reagent library may be a drug compound library. The systems of the present invention may be configured to dispense solutions, suspensions, and/or emulsions. Other non-limiting examples of reagents include small molecules and particles including polymer beads, macromolecules such as proteins, nucleic acids including DNA or RNA, carbohydrates, and lipids, and biological samples including blood, cells, and tissue samples.

As used herein, "screening" is a technique that measures the effects or activities of reagents or conditions in biological or chemical assays. High-throughput screening allows for simultaneous testing of hundreds of thousands of experimental samples, typically from a large library of compounds or substances. In some embodiments, high-throughput screening can be used in pharmaceutical applications for drug design and/or drug discovery to understand the interaction or role of a particular biochemical process or how drug compounds affect a particular biochemical process. In some embodiments, screening may be performed for a chemical library against an enzymatic reaction or other targets. In other embodiments, screening may be performed against binding assays. For example, when a protein binds to another protein or to a cell, components of the library can be screened to identify which components are best at dissociating the binding. In still other embodiments, phenotypic screens may be performed where the targets are cells or tissues, and the components of the library are screened to determine which components are best at eliciting a specific phenotypic response in the cells.

As used herein, the term "droplet" can refer to both droplets and plugs, which are larger droplets that are elongated or stretched out to fit in a channel. For instance, a plug may have a length that is at least 5 times its width. In some embodiments, a plug may be split in two by stretching out the plug and dispensing oil into the middle of the plug. In one embodiment, a microfluidic droplet may be an aqueous-phase droplet surrounded by an oil-phase carrier fluid. Alternatively, the microfluidic droplet may be an oil-phase droplet surrounded by an aqueous-phase carrier fluid. In some embodiments, the microfluidic droplet or plug may have a volume in the nanoliter range or smaller.

Without wishing to limit the present invention, the systems and methods described herein can accelerate the process of dispensing a reagent library. This is accomplished by employing a large array of droplet dispensers, controlled by the novel row-column addressing scheme, to dispense the reagent library in a microfluidic droplet format. In some embodiments, the large array of droplet dispensers may comprise up to and beyond 1 million droplet dispensers. For example, the system may comprise between 10,000 to 1 million droplet dispensers, between 1-2 million droplet dispensers, or over 2 million dispensers. It is understood by one of ordinary skill in the art that the system may perform equally well for a lower number of droplet dispensers such as, for example, 16, 64, 256, 1024, or 4096 droplet dispensers.

The array of wells, also referred to as reservoirs, may be organized into a plurality of rows and a plurality of columns. In exemplary embodiments, each reservoir is fluidly coupled to a droplet dispenser, which acts as an individual dispenser for said reservoir to dispense a microfluidic droplet of the reagent stored therein. The reagent library may be dispensed such that each microfluidic droplet comprises a single chemical compound. Alternatively, a combinatorial reagent library may be dispensed, where each microfluidic droplet comprises a combination of reagents. Reagent combinations may be created by dispensing a first chemical compound droplet from one reservoir, and then dispensing a second chemical compound from another reservoir directly into the first droplet. Reagents from additional reservoirs can be further dispensed into the same droplet to create more complex combinations. For example, as shown in FIGS. 8A-8E, a yellow droplet is dispensed and then injected with green reagent, followed by an injection of red reagent. Combinatorial droplet libraries may be created by loading the array with a set of reagents and then mixing together different combinations of these reagents.

In some embodiments, a microfluidic droplet of the reagent is dispensed into a common microfluidic channel having a continuous phase fluid flowing therein. The common microfluidic channel may be fluidly coupled to all of the droplet dispensers. Alternatively, instead of using a single microfluidic channel connecting to all the wells, it may be advantageous to use a plurality of microfluidic channels, particularly for larger arrays. For example, in a million-well array, 1000 parallel microfluidic channels may each be fluidly coupled to 1000 wells.

Once a droplet library is generated, additional steps may be required to complete an entire screening reaction. For instance, an exemplary screening reaction may comprise an enzyme, a substrate, a detection reagent, and the candidate compound. Individual reaction components may be held in separate droplets that are then merged or fused to start the reaction. Alternatively, a reagent may be injected directly into a droplet. This can be done by opening a dispensing valve while a target droplet is positioned directly adjacent to the valve. Synchronizing the opening of the valve with the position of the droplet may be assisted by employing machine vision techniques.

Figure 12A:
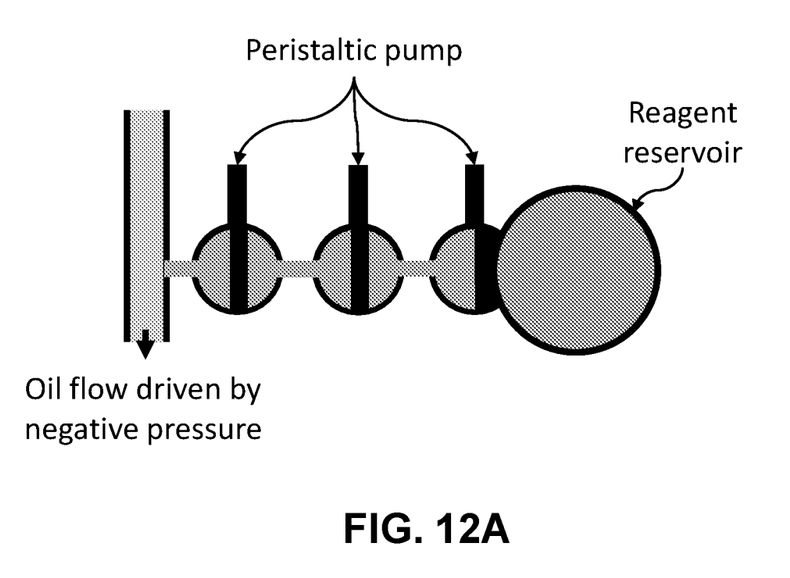
FIG. 12A shows an alternative embodiment of the dispensing mechanism employing a peristaltic pump comprising three valves in series to control release of a microfluidic droplet from a reservoir.

The system of the present invention may utilize an addressing scheme to allow independent control of each droplet dispenser. In one embodiment, the addressing scheme is a row-column addressing scheme activating a droplet dispenser when both a row-select line and a column-select line of the droplet dispenser are activated. Alternative dispensing strategies could be employed as well. Instead of dispensing droplets by using a pressure differential and a single gating valve, a full peristaltic pump could be placed between each well and the oil channel as shown in FIG. 12A. A peristaltic pump comprises two or more in-series valves that open and close following a pattern that produces liquid pumping. The row-column addressing scheme controls a plurality of peristaltic pumps, which in turn control the dispensing of droplets from the array of reservoirs. Each peristaltic pump may be fluidly coupled to a reservoir, drawing the chemical compound from each reservoir into a common microfluidic channel ("common channel"). The plurality of peristaltic pumps may be controlled individually, collectively in parallel, or in subsets, where a group of peristaltic pumps comprising a subset are controlled in parallel.

Figure 1:
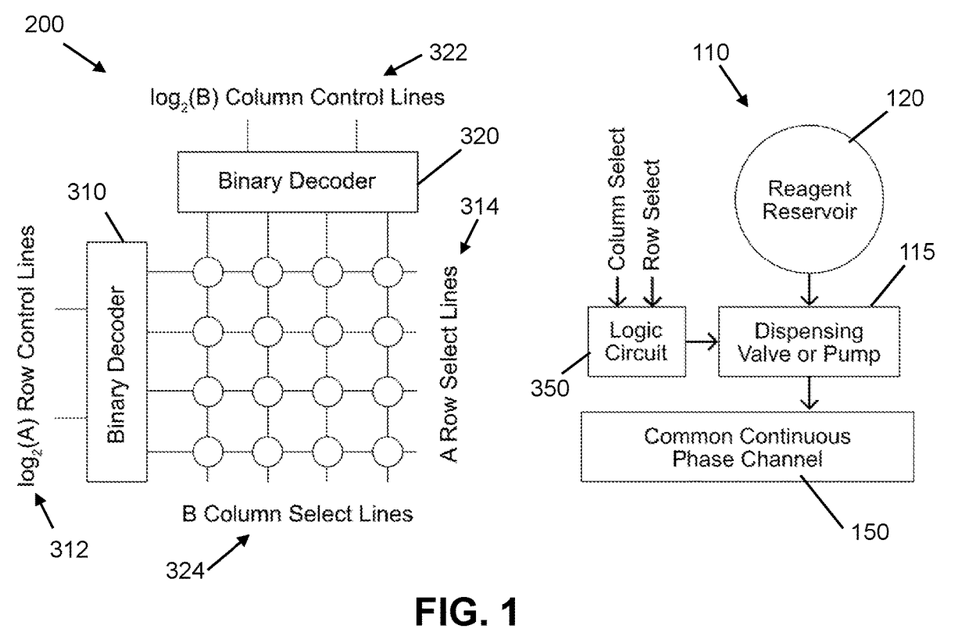
FIG. 1 shows an embodiment of a system of the present invention. The system includes array of droplet dispensers containing reagents and arranged in a grid format. Row-column addressing can be implemented to connect and control a large number of dispensers by a much smaller number of address lines, also referred to herein as select lines. When a particular row and column are selected, a reagent droplet is dispensed from a reservoir well at that row-column address. The addition of binary decoders allows the row-column address to be inputted as a binary value, thereby further reducing the number of input lines required.

Referring now to FIG. 1. In some embodiments, the present invention features microfluidic logic controller (300) for individually controlling a plurality of valves (115). In one embodiment, the valves may be arranged in an array of rows (102) and columns (104). The controller (300) may comprise a plurality of row-select lines (314) and a plurality of column-select lines (324) that correspond to a row-column address of each of the plurality of valves (115). For each row (102) of the array, a row-select line (314) is operatively coupled to the valves (115) disposed on said row (102), and for each column (104) of the array, a column-select line (324) is operatively coupled to the valves (115) disposed on said column (104) of the array, thereby assigning to each valve (115) a unique row-column address. In some embodiments, each valve (115) may be operatively coupled to its row-select line (314) and its column-select line (324) via a logic circuit (350). The logic circuit (350) is configured to actuate the valve (115) only if the logic circuit (350) receives signals from both of the row-select line (314) and the column-select line (324) corresponding to the row-column address of said selected valve (115).

Figure 4:
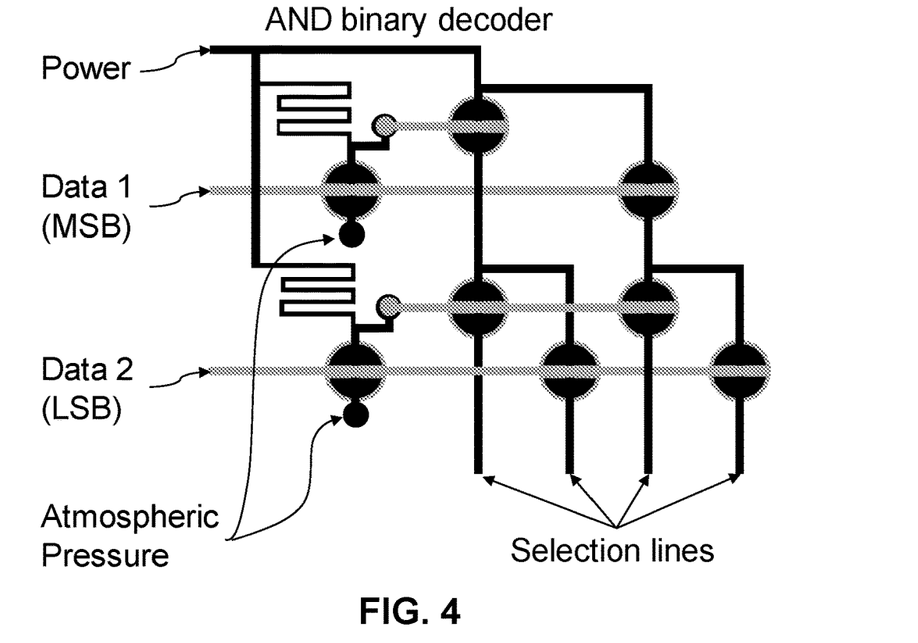
FIG. 4 shows a non-limiting embodiment of an AND binary decoder that may be used in row-column addressing to reduce the number of control lines. MSB is most significant bit and LSB is least significant bit.

In some embodiments, the controller may further comprise a first binary decoder (310) that outputs a signal to a row-select line (314) of a selected row when a binary address corresponding to the selected row is inputted to the first binary decoder (310) via a set of row-control lines (312). Similarly, the controller may further comprise a second binary decoder (320) that outputs a signal to a column-select line (322) of a selected column when the binary address corresponding to the selected column is inputted to the second binary decoder (320) via a set of column-control lines (322). An example of a binary decoder that may be implemented is shown in FIG. 4. Each input bit passes through a NOT inverter in order to generate complementary signals, which then drive a binary tree.

Figure 3:
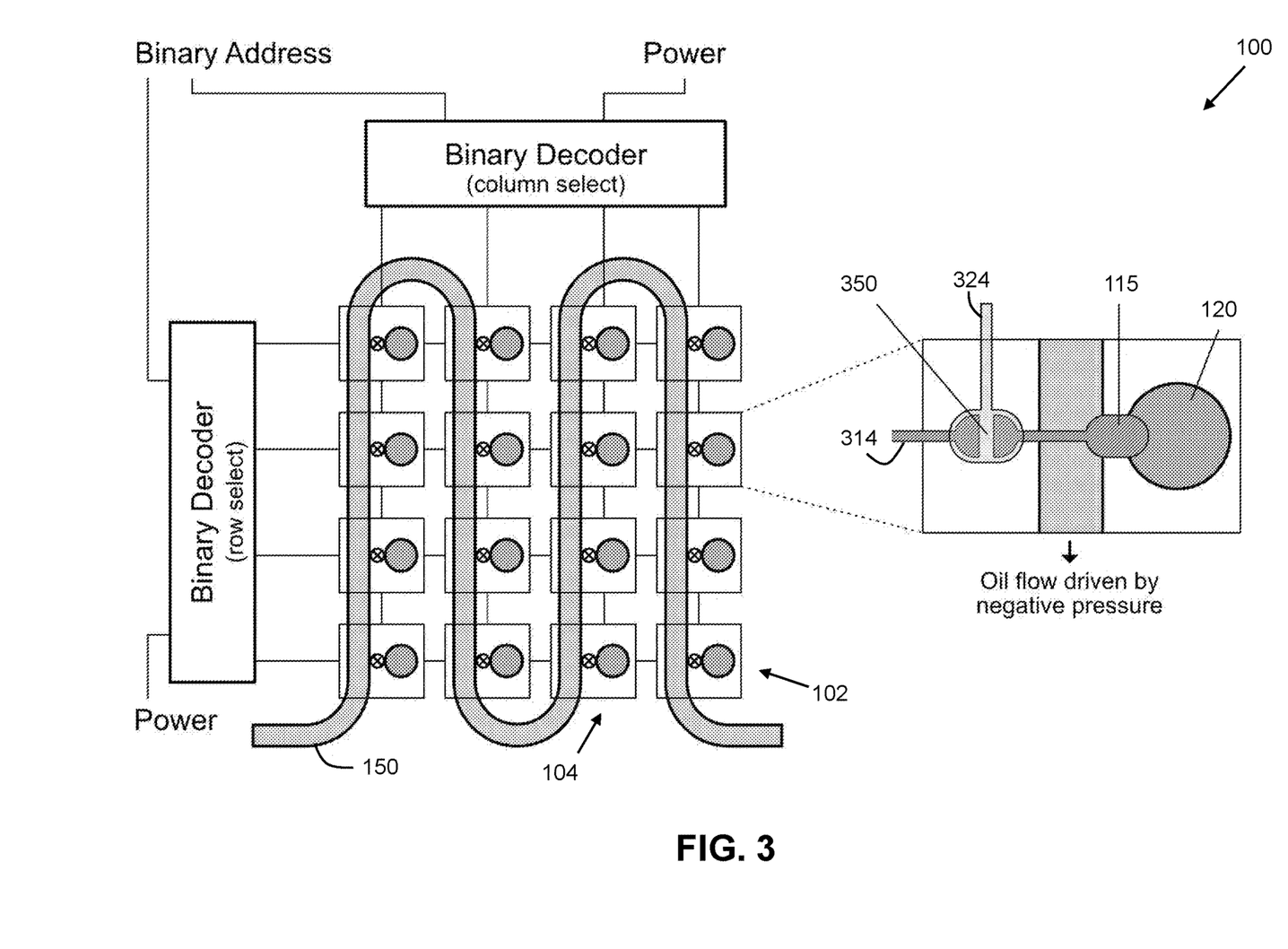
FIG. 3 shows an exemplary embodiment of the row-column addressing scheme for a droplet-on-demand array of the present invention.

According to some embodiments, a corresponding row select line (314) is configured to accept a first input vacuum pressure, and a corresponding column select line (324) is configured to accept a second input vacuum pressure based on the unique row-column address of the selected valve (115). Although the first vacuum pressure is applied to the row-select line (314) associated with the row-column address of the selected valve (115), the valve remains closed since the first vacuum pressure is gated by the logic circuit (350). Only when the second vacuum pressure is applied to the column-select line (324) associated with said row-column address can the logic gate (350) be opened to transmit the first vacuum pressure to the dispensing valve (115), thus actuating said dispensing valve (115). As shown in FIG. 3, row-column addressing can be accomplished such that each dispense valve can be opened by vacuum transmitted along a row select line and a column select line, but the vacuum is gated by a column select valve. Thus, the dispense valve can open only if vacuum is simultaneously applied to the column select line and the row select line. Alternatively, any AND logic circuit can be employed with the row select and column select comprising the circuit inputs, and with the circuit output driving the dispense valve.

According to some embodiments, one or more row-select lines (314) may be operatively coupled to the valves (115) disposed on a single row (102). For examples, the row may have two row-select lines (314) coupled to the valves in said row. In other embodiments, one or more column-select lines (324) may be operatively coupled to the valves (115) disposed on a single column (104).

A non-limiting example of a row-column addressing scheme, which provides independent control of individual droplet dispensers, includes an array comprising of N reservoirs. The plurality of rows and columns, comprising the array of wells, are referred to as A rows and B columns. In this scheme, A×B=N. In one embodiment, N may be at most 1,000,000. In another embodiment, N may be greater than 1,000,000. Each of the N reservoirs is accessed via a unique row-column address. A first vacuum pressure and a second vacuum pressure are applied when a first binary input to a decoder and a second binary input to another decoder collectively comprise the unique row-column address of a selected reservoir. One or more microfluidic droplets of the reagents disposed in the selected reservoir are then dispensed. The volume of the one or more microfluidic droplets may be controlled by the time period in which the associated dispense valve remains open.

In one embodiment, the microfluidic logic controller (300) for individually controlling an "N" number of droplet dispensers (110) arranged in an array having "A" number of rows (102) and "B" number of columns (104) may comprise "A" row-select lines (314) and "B" column-select lines (324). For each row (102) of the array, one row-select line (314) is operatively coupled to the droplet dispensers (110) disposed on said row (102) and similarly, for each column (104) of the array, one column-select line (324) is operatively coupled to the droplet dispensers (110) disposed on said column (104). A first binary decoder (310) may be operatively coupled to the row-select lines (314), and a second binary decoder (320) may be operatively coupled to the column-select lines (324). In some embodiments, the first binary decoder (310) can have $\log_2$ (A) row control lines (312) for controlling the "A" row-select lines (314). The second binary decoder (320) can have $\log_2$ (B) column control lines (322) for controlling the "B" column-select lines (324).

The first binary decoder (310) may be configured to receive a first binary input and the second binary decoder (320) may be configured to receive a second binary input that correspond to the row-column address of a selected droplet dispenser (110). An input vacuum pressure is then applied to the row-select line and column-select based on the unique row-column address of the selected dispenser. In preferred embodiments, each droplet dispenser (110) has a unique row-column address defined by its row-select line (314) and column-select line (324). Each droplet dispenser (110) may be operatively coupled to its row-select line (314) and column-select line (324) via a logic gate (350) that actuates a dispensing valve (115) of said droplet dispenser (110) only if the logic gate receives signals, i.e. input vacuum pressure, from both of the row-select line (314) and the column-select line (324) corresponding to the row-column address of the selected droplet dispenser (110).

Consistent with the embodiments described herein, the valve (115) may be a dispensing valve. The dispensing valve may be a normally closed valve. In some embodiments, the logic circuit (350) may comprise a logic gate. The logic gate (350) can be a pneumatic or hydraulic logic gate. In some embodiments, the logic gate (350) may be a normally-closed valve. In other embodiments, the logic gate (350) comprises two valves disposed in series.

According to another embodiment, the present invention may feature a droplet dispensing array (200) for generating a droplet reagent library. The droplet dispensing array (200) may comprise an "N" number of droplet dispensers (110) arranged in an array of rows (102) and columns (104), and a microfluidic logic controller (300) configured to implement a row-column addressing scheme for controlling the droplet dispensers. In some embodiments, each droplet dispenser (110) may comprise a well (120) fluidly coupled to a dispensing valve (115). The droplet dispensing array (200) may be configured to dispense a reagent droplet that is in the form of a droplet or plug. In some embodiments, a volume of the reagent droplet may be less than 1000 nanoliters.

Consistent with previous embodiments, the microfluidic logic controller (300) may comprise a plurality of row-select lines (314), a plurality of column-select lines (324), and an "N" number of logic circuits (350). For each row (102) of the array, a row-select line (314) may be operatively coupled to the droplet dispensers (110) disposed on said row (102), and for each column (104) of the array, a column-select line (324) may be operatively coupled to the droplet dispensers (110) disposed on said column (104). Further still, each logic circuit (350) may be operatively coupled to one dispensing valve (115) such that said logic circuit (350) is configured to actuate the dispensing valve (115). Each droplet dispenser (110) may be associated with a unique row-column address defined by its row-select line (314) and column-select line (324). The droplet dispenser (110) may be operatively coupled to its row-select line (314) and its column-select line (324) via the logic circuit (350) that actuates the dispensing valve (115) only if said logic circuit receives signals from both of the row-select line (314) and the column-select line (324) corresponding to the row-column address of said selected droplet dispenser (110).

In some embodiments, to prepare the dispensing array, each well may be filled with a reagent. Each well (120) can store a reagent in volumes sufficient for dispensing of multiple droplets. Further still, each well can store a different reagent, or multiple wells can store the same reagent. Alternatively, a well may store a continuous phase fluid which can be used for splitting droplets, as will be later described herein. In some embodiments, the reagents are derived from a chemical or drug compound library. Examples of reagents include, but are not limited to, chemicals, drug compounds, microparticles, small molecules, proteins, nucleic acids, carbohydrates, lipids, blood, cells, tissue samples, or any combination thereof. In one embodiment, the wells may be sealed by an adhesive layer covering an opening of the well. In another embodiment, the wells may be sealed by an oil fluid layered on top of the reagent.

Figure 12B:
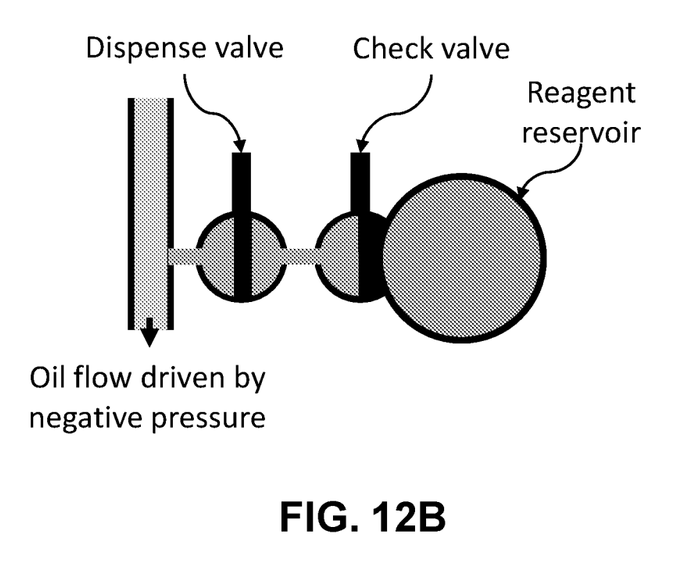
FIG. 12B shows an alternate embodiment of the dispensing mechanism employing a peristaltic pump comprising a dispense valve and a check valve to control release of a microfluidic droplet from a reservoir.

In some embodiments, the dispensing valve (115) may be a normally closed valve. In an alternative embodiment, as shown in FIGS. 12A-12B, the dispensing valve (115) may instead comprise two or more valves fluidly coupled in series to function as a peristaltic pump. The valves are actuated in a pattern such that the reagent is pumped out from the well. In one embodiment, one or more row-select lines (314) may be operatively coupled to the valves (115) disposed on a single row (102). Similarly, one or more column-select lines (324) may be operatively coupled to the valves (115) disposed on a single column (104).

In some embodiments, for a selected row, a first binary decoder (310) may be used to output a signal to the row-select line (314) of the selected row when a binary address corresponding to the selected row is inputted to the first binary decoder (310) via a set of row-control lines (312). In other embodiments, a second binary decoder (320) may be used to output a signal to the column-select line (322) for a selected column when the binary address corresponding to the selected column is inputted to the second binary decoder (320) via a set of column-control lines (322). In some embodiments, a corresponding row select line (314) is configured to accept a first input vacuum pressure, and a corresponding column select line (324) is configured to accept a second input vacuum pressure based on the unique row-column address of the selected droplet dispenser (110). The logic circuit (350) can gate the first vacuum pressure applied to the row-select line (314) associated with the row-column address of the selected droplet dispenser (110) until the second vacuum pressure is applied to the column-select line (324) associated with said row-column address. This causes the logic circuit (350) to open and transmit the first vacuum pressure to the dispensing valve (115), thus actuating said dispensing valve (115).

In one embodiment, the logic circuit (350) may be a pneumatic or hydraulic logic gate. Preferably, the logic gate is a normally-closed valve. In another embodiment, the logic gate comprises two valves disposed in series. In other embodiments, a timing circuit may be integrated with the dispensers. For example, the logic circuit (350) may further comprise a timing circuit integrated next to each dispenser to provide more accurate control of valve timing and dispense volume.

In an exemplary embodiment, the droplet dispensing array (200) may comprise an "N" number of droplet dispensers (110) arranged in an array having an "A" number of rows (102) and a "B" number of columns (104) such that A×B=N, and a microfluidic logic controller (300). Each droplet dispenser (110) can comprise a well (120) storing a reagent and fluidly coupled to a dispensing valve (115). The microfluidic logic controller (300) may comprise "A" row-select lines (314), "B" column-select lines (324), a first binary decoder (310) operatively coupled to the row-select lines (314), a second binary decoder (320) operatively coupled to the column-select lines (324), and an "N" number of logic gates, each logic gate operatively coupled to a dispensing valve (115) and configured to actuate said dispensing valve (115). For each row (102) of the array, one row-select line (314) may be operatively coupled to the droplet dispensers (110) disposed on said row (102). For each column (104) of the array, one column-select line (324) is operatively coupled to the droplet dispensers (110) disposed on said column (104). In one embodiment, the first binary decoder (310) may have $\log_2$ (A) row control lines (312) for controlling the "A" row-select lines (314). In another embodiment, the second binary decoder (320) may have $\log_2$ (B) column control lines (322) for controlling the "B" column-select lines (324).

In preferred embodiments, each droplet dispenser (110) has a unique row-column address defined by its row-select line (314) and column-select line (324). In some embodiments, the first binary decoder (310) is configured to receive a first binary input and the second binary decoder (320) is configured to receive a second binary input corresponding to the row-column address of a selected droplet dispenser (110). The droplet dispenser (110) can be operatively coupled to its row-select line (314) and its column-select line (324) via the logic gate (350) coupled to the dispensing line (314) of the droplet dispenser (110). As such, the dispensing valve (115) can be actuated to dispense a reagent droplet from the well only if its associated logic gate receives signals from both of the row-select line (314) and the column-select line (324) corresponding to the row-column address of the selected droplet dispenser (110).

In some embodiments, the dispenser array (200) of the present invention may be used for dispensing, merging, and splitting droplets. The dispenser array may be combined with hydrodynamic trapping structures, such as physical barriers, to create a stationary array of droplets. Droplets dispensed from the array, or droplets created outside of the array, may be trapped using said structures. The traps may be positioned to facilitate the pairing of trapped droplets with subsequently dispensed droplets for merging. In some embodiments, droplet merging can be accomplished by: 1) dispensing directly into another droplet, 2) pairing two droplets closely and merging with an electrical pulse, or 3) pairing two droplets and merging with a hydrodynamic structure. Alternatively, a trap may be positioned to facilitate the dispensing of oil into a specific location in a trapped plug, thus facilitating an accurate split.

Referring to FIG. 3, in various embodiments, the present invention may feature a system (100) for generating a reagent droplet. The system may comprise any embodiment of the droplet dispensers (110) and microfluidic logic controllers (300) described herein, combined with a microfluidic channel network (150) configured to have a continuous phase fluid flowing therein. Additional features of the droplet dispensers (110) and microfluidic logic controllers (300) are consistent with the embodiments described herein. The microfluidic channel network (150) may be fluidly coupled to each of the droplet dispensers such that the microfluidic channel network (150) can receive reagent droplets dispensed from the wells (120) when the dispensing valve is actuated. In one embodiment, the microfluidic channel network (150) may comprise a single continuous phase channel that comprises a serpentine portion that winds from row-to-row or column-to-column so as to serially couple the droplet dispensers. In an alternative embodiment, the microfluidic channel network (150) may comprise a plurality of continuous phase channels, wherein each channel is disposed in along a single row such that rows of droplet dispensers are coupled to the continuous phase channels in parallel.

Figure 9A:
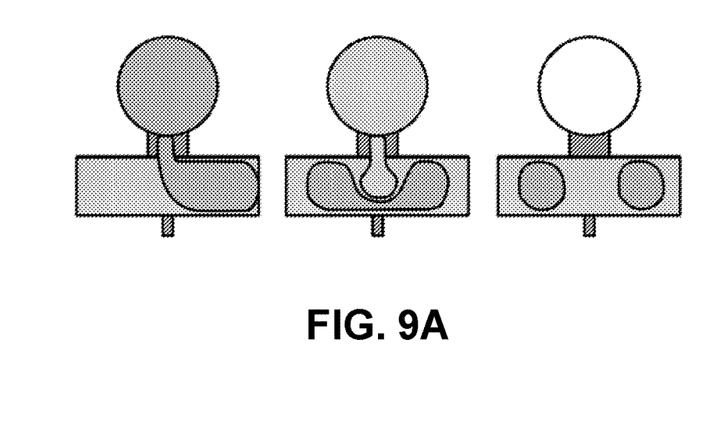
FIG. 9A shows a non-limiting scheme of droplet splitting via sequential injection. A first droplet of reagent A is dispensed from a reservoir containing reagent A. As the droplet passes another reservoir containing the continuous phase fluid, the continuous phase fluid is injected directly into the first droplet, thus splitting the first into two parts.
Figure 9B:
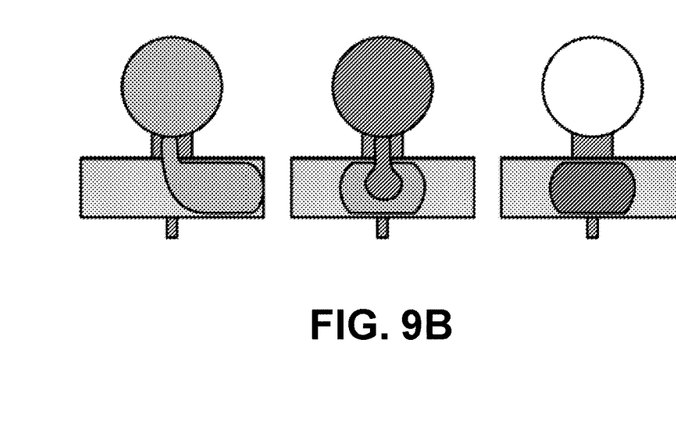
FIG. 9B shows a non-limiting scheme of droplet merging via sequential injection. A first droplet of reagent A is dispensed from a reservoir containing reagent A. As the droplet passes another reservoir containing reagent B, a droplet of reagent B is injected directly into the first droplet, thus merging and forming a droplet of reagent A and B.
Figure 9C:
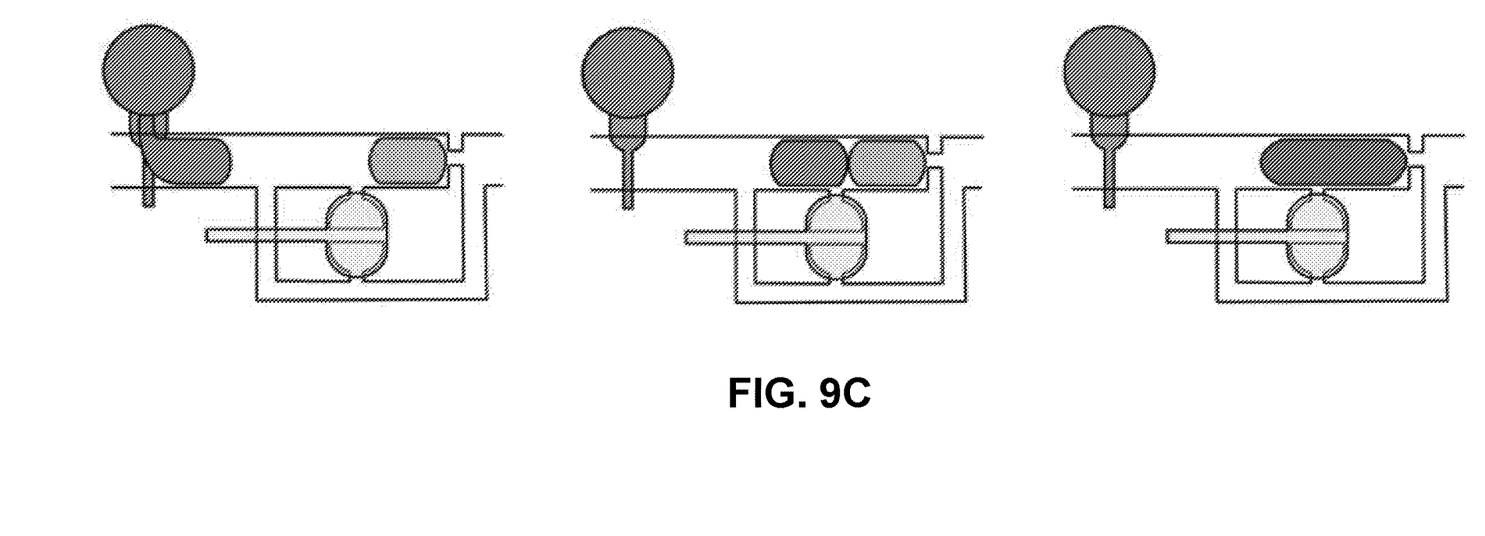
FIG. 9C shows a non-limiting scheme of droplet merging via hydrodynamic trapping. A first droplet of reagent A is dispensed from a reservoir containing reagent A, and enters a hydrodynamic droplet trap. Subsequent droplets continue past the droplet trap via a bypass loop while a shunt valve is closed. Opening of the shunt valve causes a second droplet containing reagent B to enter the hydrodynamic trap and merge with the first droplet, thus forming a droplet containing reagent A and B.
Figure 10A:
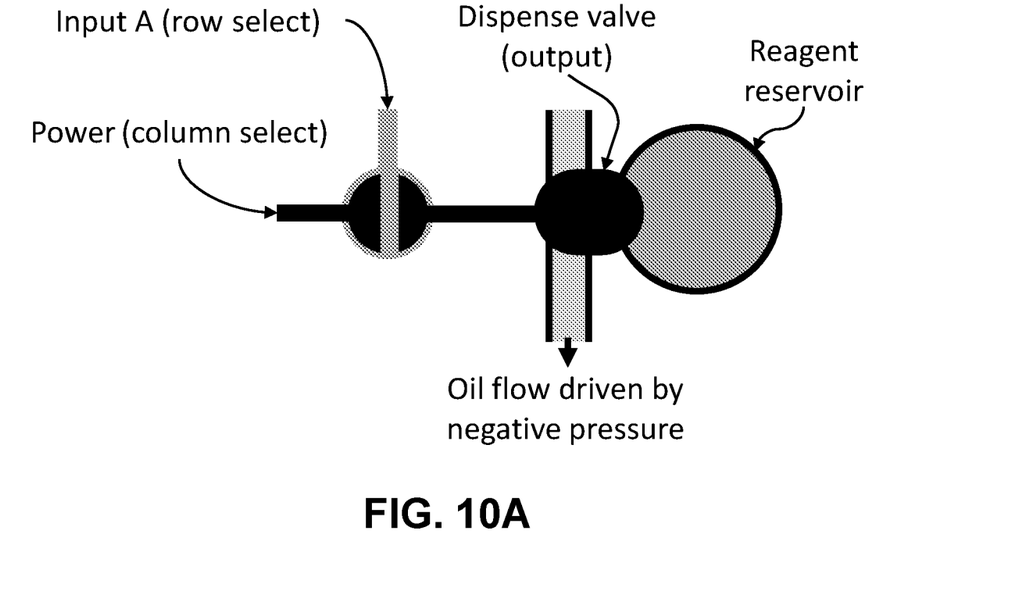
Figure 10B:
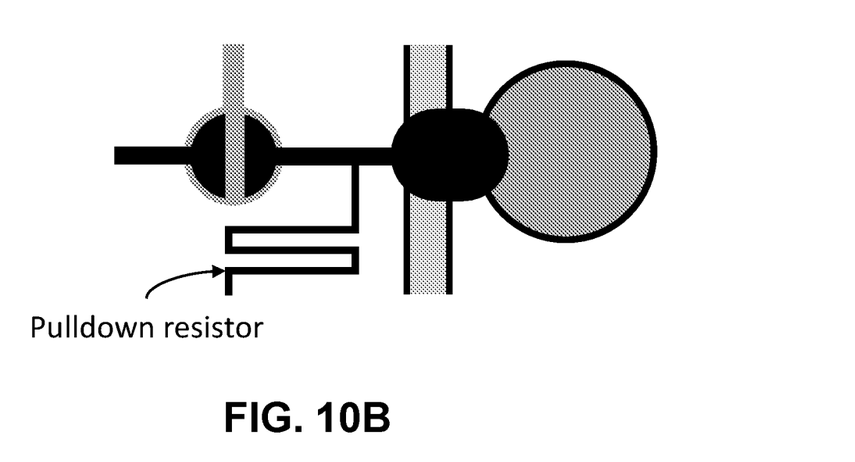
Figure 11A:
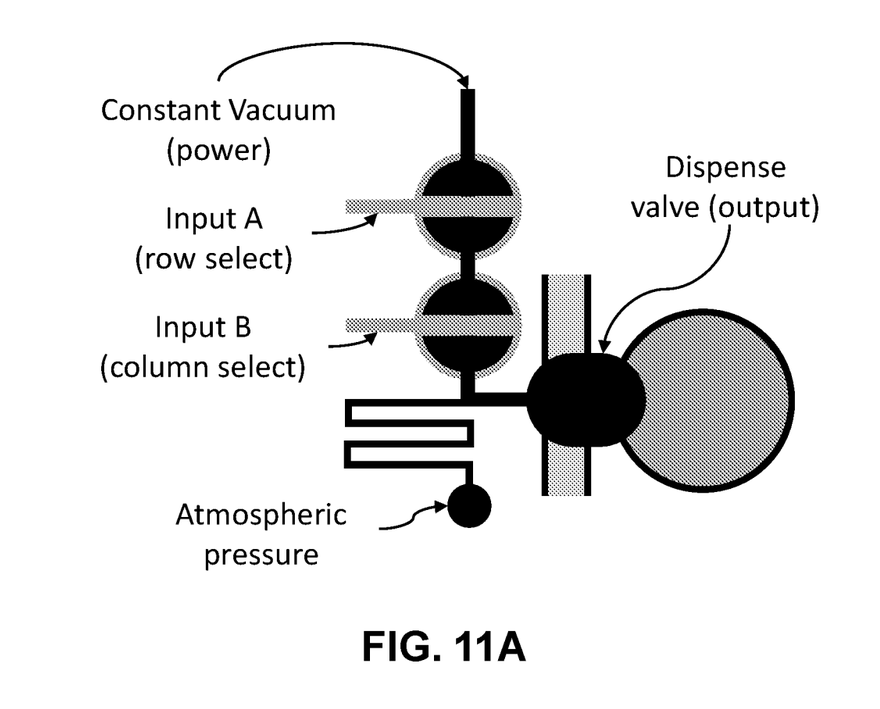
Figure 11B:
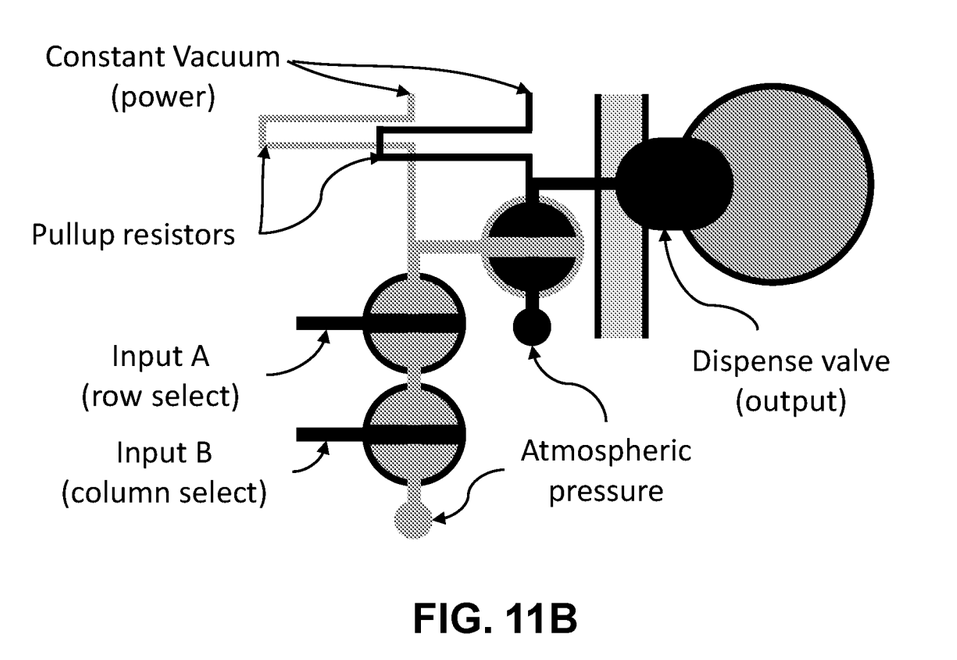

Since a system of the dispensing arrays and microcontrollers has been described, it is an objective of the present invention to also provide methods of utilizing said systems. Referring to FIG. 9A-9C, the present invention further includes a method of manipulating a droplet. In one embodiment, the method may comprise providing any embodiment of the system (100) described herein, with the dispenser wells (120) containing reagents, flowing a continuous phase fluid through the microfluidic channel network (150), inputting to the microfluidic logic controller (300) a row-select input and a column-select input corresponding to a row-column address of a selected droplet dispenser (110), thereby activating a logic circuit (350) corresponding to the selected droplet dispenser (110), and dispensing a reagent droplet from the well (120) into the continuous phase fluid of the microfluidic channel network via actuation of the dispensing valve (115) by the activated logic circuit (350), and repeating the steps of inputting a row-column address and dispensing a second reagent droplet from another well such that the second reagent droplet merges with or splits the first reagent droplet.

In one embodiment, the method may be effective for producing droplets containing a combination of reagents. As shown in FIG. 9B, the combination reagent droplets may be prepared by dispensing the first reagent droplet from one well, and then dispensing subsequent reagents directly into the first reagent droplet. Alternatively, the combination reagent droplets may be prepared by pairing the first and second reagent droplets and merging them together with an electrical pulse. In another embodiment, shown in FIG. 9C, the combination reagent droplets may be prepared by pairing the first and second reagent droplets and merging them together using a hydrodynamic trapping structure. In yet another embodiment, the method may be effective for splitting reagent droplets. As shown in FIG. 9A, the first reagent droplet can be split into two droplets by dispensing a second reagent that is immiscible with the first reagent directly into the first reagent droplet, thereby splitting the first reagent droplet. The method of manipulating the droplets, via dispensing, merging, and/or splitting, can be used to perform screening reactions.

According to another embodiment, the systems described herein may be used in a method of generating a reagent droplet library. The method may comprise any embodiment of the system (100) described herein with the dispenser wells (120) storing reagents from a reagent library, flowing a continuous phase fluid through the microfluidic channel network (150), and inputting to the microfluidic logic controller (300) a row-select input and a column-select input corresponding to a row-column address of a selected droplet dispenser (110), thereby activating a logic gate (350) corresponding to the selected droplet dispenser (110), which actuates the dispensing valve (115) to dispense a reagent droplet from the well (120) into the continuous phase fluid of the microfluidic channel network. The step of inputting a row-column address may be repeated for every selected droplet dispenser, thereby producing the reagent droplet library. The reagent droplet libraries generated by the systems and methods described herein may be used in a screening reaction, such as an enzymatic reaction, a binding assay, or a phenotypic screen.

In some embodiments, the reagent droplet library is dispensed such that each droplet comprises a single reagent. In alternative embodiments, the reagent droplet library comprises droplets containing a combination of reagents. In one embodiment, the combination reagent droplets may be prepared by dispensing a first reagent droplet, and then dispensing subsequent reagents directly into the first reagent droplet. In another embodiment, the combination reagent droplets may be prepared by pairing two reagents droplets and merging them together with an electrical pulse. In yet another embodiment, the combination reagent droplets may be prepared by pairing two reagents droplets and merging them together using a hydrodynamic trapping structure. In other embodiments, at least one well can contain a splitting fluid, such as a continuous phase fluid, configured to split a droplet. For instance, a target reagent droplet can be split into two or more droplets by dispensing the splitting fluid into specific locations of the target reagent droplet, thereby splitting the target reagent droplet.

Consistent with previous embodiments, the control signals of the addressing scheme may have to travel long distances before reaching a specific dispenser. This could make the circuits susceptible to parasitic resistance and capacitance that may degrade how accurately dispensing can be controlled. To rectify this, a timing circuit may be integrated on chip close to the dispenser in order to achieve more accurate control of valve timing and dispense volume.

Figure 7A:
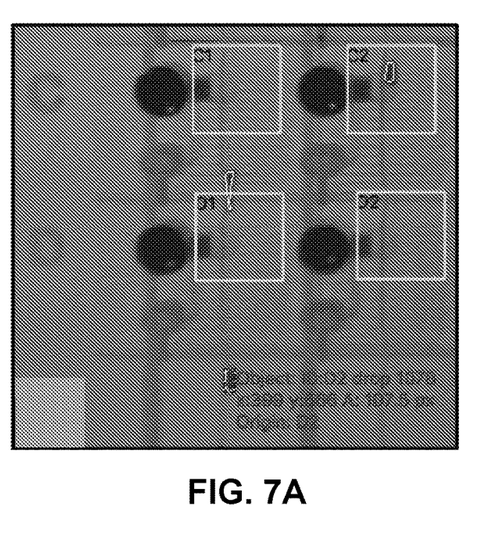
FIGS. 7A-7B shows the use of computer vision providing closed loop feedback for droplet merging. Video of the array in FIG. 7A is processed in real-time using custom software that identifies and tracks objects, as shown in FIG. 7B.
Figure 7B:
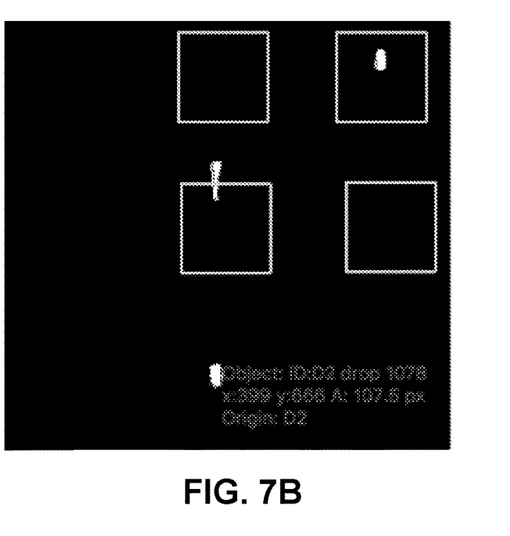
Figure 8A:
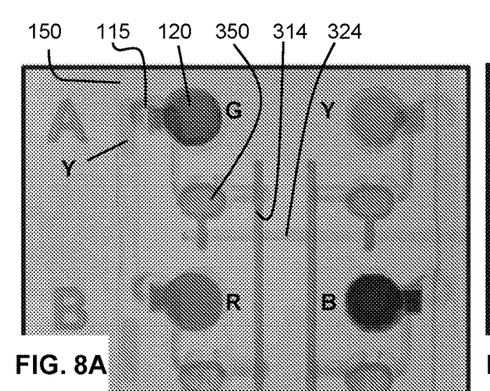
Figure 8B:
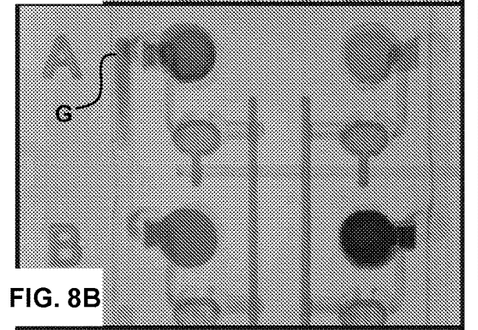
Figure 8C:
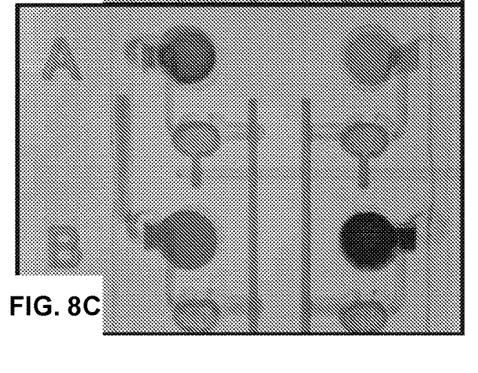
Figure 8D:
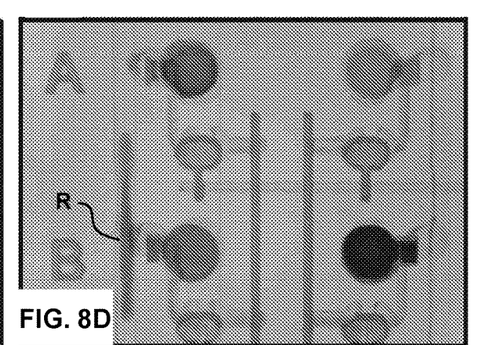
Figure 8E:
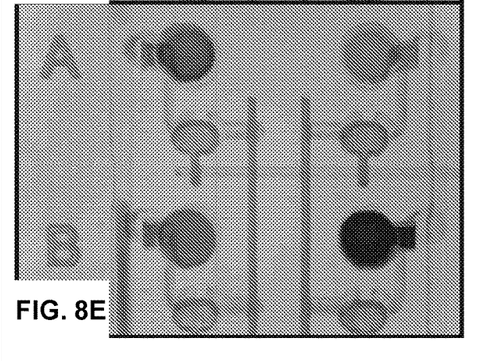

Referring to FIGS. 7A-7B, in accordance with previous embodiments, an imaging region may be included in the system to monitor the progression or result of chemical or screening reactions. In some embodiments, machine vision may be used to track the position of droplets in the system. In other embodiments, sensors may be integrated on the chip to track the position of droplets in the system.

Examples

The following is a non-limiting example of implementing the dispenser array and addressing scheme of the present invention. It is to be understood that the examples are for illustrative purposes only and are not intended to limit the invention in any way. Equivalents or substitutes are within the scope of the present invention.

Experimental Procedures

Figure 5:
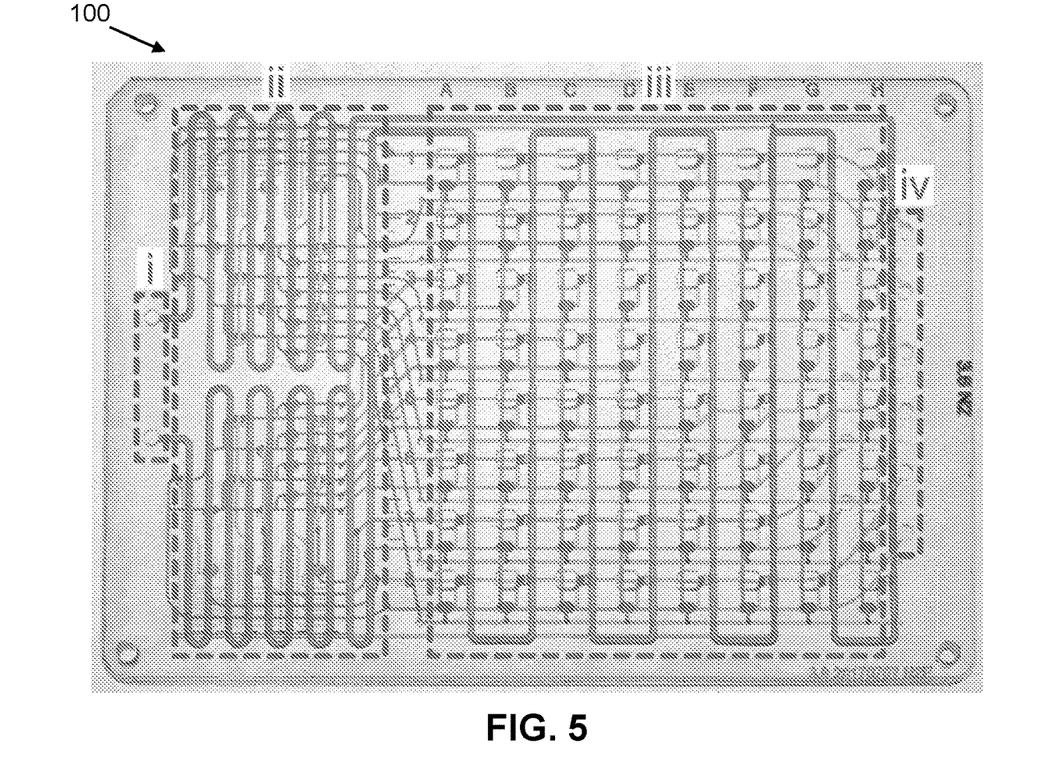
FIG. 5 shows an exemplary embodiment of a 64-well array. A top layer includes oil ports (i), reagent reservoirs (iii), and pneumatic control ports (iv). Lower layers include pneumatic logic circuits including binary decoders (ii) and a row-column addressing network (iii).
Figure 6:
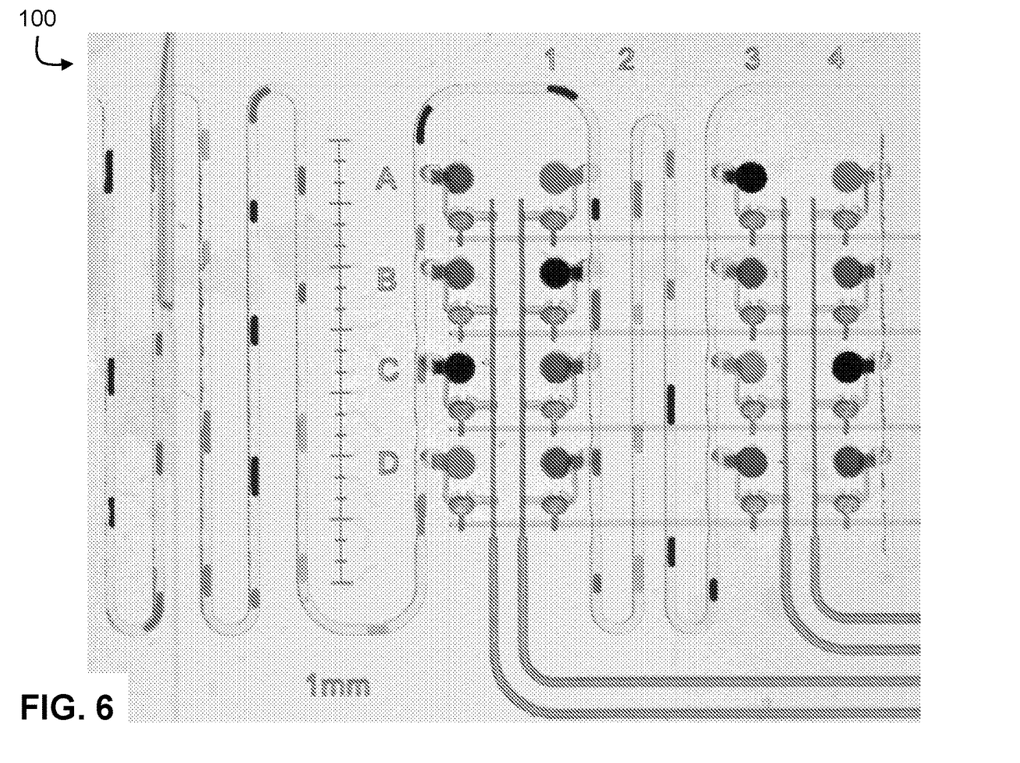
FIG. 6 is an alternative embodiment of a 16-well array shown generating three sizes of droplets from each reservoir.

Referring to FIGS. 5-6, multilayer pneumatic and fluidic circuits were fabricated by aligned stacking of laser-cut sheets of acrylic and silicone. The droplet-on-demand dispensers draw from an array of wells spaced to match standard microliter plates. A common oil channel winds beneath all of the wells, with a normally-closed pneumatic membrane valve gating the connection between each well and the channel. Dispensing is controlled by row-column addressing using AND logic to control each dispensing valve. Referring to FIG. 5, 64 gates, each drawing from a separate reagent reservoir, were independently addressed by 8+8 control lines. Binary decoders were further employed to drive both the row and column address lines, reducing the number of control lines to 3+3. In the binary decoder, each input bit passes through a NOT inverter in order to generate complementary signals, which then drive a binary tree.

Results

The present invention was embodied in 4×4 (FIG. 6) and 8×8 (FIG. 5) dispenser arrays with independent switching of individually addressable droplet dispensers at up to 10 Hz and metered volumes ranging from 50 to 600 nL. Droplets were tracked on chip by machine vision, allowing the sequential injection of reagents from multiple dispensers into a single droplet with closed loop feedback. Referring to FIG. 7A-7B, software processes video images of the array in real-time, extracts droplet morphology and position information, and controls the solenoids that drive the control lines of the array.

As shown in FIG. 8A-8E, the use of sequential injection was demonstrated to create combinatorial droplets drawing from up to 4 different reagent reservoirs. In some embodiments, there are 635,376 different combinations that can be created by choosing 4 reagents out of 64 options, underscoring that even modest arrays can access large libraries that would require significant time and cost to produce by robotic liquid handling. Combinatorial droplet libraries may be useful for applications such as the screening of drug combination therapies for personalized medicine.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the below claims are exemplary and solely for ease of examination of this patent application and are not intended in any way to limit the scope of the claims to the particular features having the corresponding reference numbers in the drawings. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. A system (100) for generating a reagent droplet, said system comprising:
   a. an "N" number of droplet dispensers (110) arranged in an array of rows (102) and columns (104), wherein each droplet dispenser (110) comprises a well (120) fluidly coupled to a dispensing valve (115), wherein the well (120) stores a reagent, wherein the dispensing valve (115) is normally closed;
   b. a microfluidic logic controller (300) comprising:
      i. an "A" number of row-select lines (314), wherein for each row (102) of the array, one row-select line (314) is operatively coupled to the droplet dispensers (110) disposed on said row (102);
      ii. a "B" number of column-select lines (324), wherein for each column (104) of the array, one column-select line (324) is operatively coupled to the droplet dispensers (110) disposed on said column (104); and
      iii. an "N" number of logic circuits (350), each logic circuit (350) operatively coupled to one dispensing valve (115) such that said logic circuit (350) is configured to actuate the dispensing valve (115), wherein "N"≥1, "A"≥1, and "B"≥1, wherein A×B=N; and
   c. a microfluidic channel network (150) configured to have a continuous phase fluid flowing therein, wherein the microfluidic channel network (150) is fluidly coupled to each of the droplet dispensers, wherein the microfluidic channel network (150) is adapted to receive reagent droplets dispensed from the wells (120);
   wherein each droplet dispenser (110) is associated with a unique row-column address defined by its row-select line (314) and column-select line (324), wherein each droplet dispenser (110) is operatively coupled to its row-select line (314) and its column-select line (324) via the logic circuit (350) that actuates the dispensing valve (115) only if said logic circuit receives signals from both of the row-select line (314) and the column-select line (324) corresponding to the row-column address of said selected droplet dispenser (110), wherein actuation of the dispensing valve allows for dispensing of a reagent droplet from the well (120) and into the microfluidic channel network (150).

2. The system (100) of claim 1, wherein the microfluidic channel network (150) comprises a single continuous phase channel that comprises a serpentine portion that winds from row-to-row or column-to-column so as to serially couple the droplet dispensers.

3. The system (100) of claim 1, wherein the microfluidic channel network (150) comprises a plurality of continuous phase channels, wherein each channel is disposed in along a single row such that rows of droplet dispensers are coupled to the continuous phase channels in parallel.

* * * * *